(12) United States Patent
Li et al.

(10) Patent No.: US 12,065,614 B1
(45) Date of Patent: Aug. 20, 2024

(54) BRANCHED CELLULOSE-BASED HYDRAULIC FRACTURING FLUID CROSSLINKER

(71) Applicants: Saudi Arabian Oil Company, Dhahran (SA); King Fahd University of Petroleum and Minerals, Dhahran (SA)

(72) Inventors: Wengang Li, Dhahran (SA); Bader Ghazi Al-Harbi, Dammam (SA); Majad Khan, Dhahran (SA); Muhammad Nawaz Tahir, Dhahran (SA)

(73) Assignees: Saudi Arabian Oil Company, Dhahran (SA); King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 18/295,059

(22) Filed: Apr. 3, 2023

(51) Int. Cl.
*C09K 8/68* (2006.01)
*E21B 43/26* (2006.01)

(52) U.S. Cl.
CPC .............. *C09K 8/685* (2013.01); *E21B 43/26* (2013.01)

(58) Field of Classification Search
CPC ................................ C09K 8/685; E21B 43/26
See application file for complete search history.

(56) References Cited

U.S. PATENT DOCUMENTS

| | | | |
|---|---|---|---|
| 5,304,620 A | 4/1994 | Holtmyer et al. | |
| 5,445,765 A | 8/1995 | Elfers et al. | |
| 7,431,845 B2 | 10/2008 | Manek et al. | |
| 7,858,561 B2 | 12/2010 | Abad et al. | |
| 9,790,777 B2 | 10/2017 | Nguyen et al. | |
| 10,308,726 B2 | 6/2019 | Dang | |
| 10,329,475 B2 | 6/2019 | Al-Muntasheri et al. | |
| 10,688,216 B2 | 6/2020 | Stockman et al. | |
| 11,097,252 B2 | 8/2021 | Hummersone et al. | |
| 2006/0196662 A1* | 9/2006 | Hanes, Jr. | C09K 8/90 166/305.1 |
| 2008/0153983 A1 | 6/2008 | Boeckh et al. | |
| 2014/0367511 A1* | 12/2014 | Knoblach | H04W 4/023 244/97 |
| 2015/0232739 A1 | 8/2015 | Blauch et al. | |
| 2016/0230072 A1* | 8/2016 | Reddy | E21B 43/04 |
| 2020/0123319 A1 | 4/2020 | Srivastava et al. | |
| 2020/0377691 A1 | 12/2020 | Zhen et al. | |

FOREIGN PATENT DOCUMENTS

| | | |
|---|---|---|
| CN | 112251204 A | 1/2021 |
| WO | 2015165588 A1 | 11/2015 |

OTHER PUBLICATIONS

Al-Muntasheri et al., "Evaluation of a New Cost-Effective Organic Gel System for High Temperature Water Control", International Petroleum Technology Conference, IPTC 11080, Dec. 4-6, 2007.
Amirova et al., "Influence of Cross-Linking Degree on Hydrodynamic Behavior and Stimulus-Sensitivity of Derivatives of Branched Polyethyleneimine", Polymers, vol. 12, 2020, 18 pages.
Gosecki et al., "Polyglycidol, Its Derivaties, and Polyglycidol-Containing Copolymers-Synthesis and Medical Applications", Polymers, vol. 8, No. 227, 25 pages.
Reddy et al., "Natural Polymer-Based Compositions Designed for Use in Conformance Gel Systems", SPE 84510, pp. 385-393, Dec. 2005.
Voit et al., "Hyperbranched and Highly Branched Polymer Architectures-Synthetic Strategies and Major Characterization Aspects", Chem Rev., vol. 109, pp. 5924-5973, 2009.
Xia et al., "Application and Polysaccharide Biopolymer in Petroleum Recovery", Polymers, vol. 12, No. 1860, 2020, 36 pages.

* cited by examiner

*Primary Examiner* — Silvana C Runyan
(74) *Attorney, Agent, or Firm* — Dinsmore & Shohl LLP

(57) ABSTRACT

Hydraulic fracturing fluids include an aqueous fluid, an acrylamide-based polymer, and a crosslinker that crosslinks the acrylamide-based polymer to form a crosslinked gel. The crosslinker includes a cellulose backbone functionalized with branch structures. The branch structures comprise oxiranylalkanol branches or polyoxiranylalkanol branches. Methods for preparing the hydraulic fracturing fluids and methods for treating subterranean formations with the hydraulic fracturing fluids are disclosed.

16 Claims, 2 Drawing Sheets

BRANCHED CELLULOSE-BASED HYDRAULIC FRACTURING FLUID CROSSLINKER

CROSS-REFERENCES TO RELATED APPLICATIONS

None.

TECHNICAL FIELD

The present disclosure relates to hydraulic fracturing fluids, to methods for preparing the hydraulic fracturing fluids, and to methods for treating subterranean formations with the hydraulic fracturing fluids.

BACKGROUND

Hydraulic fracturing has been an important technology for oil and gas production since its first application in the 1950s. Among the components of hydraulic fracturing fluids, crosslinkers play a key role to increase viscosity of the fluids during fracturing operations for controlling fluid loss and improving capacity of the fluids to carry proppants. Typical crosslinkers for hydraulic fracturing fluids may include a metal cation such as $Fe^{3+}$, $Zr^{4+}Ti^{4+}$, a borate anion, or a polymer. There remain ongoing needs for crosslinkers that are compatible with hydraulic fracturing processes and provide hydraulic fracturing fluids that remain stable at elevated temperatures associated with the hydraulic fracturing processes.

SUMMARY

Hydraulic fracturing fluids according to this disclosure include an aqueous fluid, an acrylamide-based polymer, and a crosslinker that crosslinks the acrylamide-based polymer to form a crosslinked gel. The crosslinker comprises a cellulose backbone functionalized with branch structures. The branch structures comprise oxiranylalkanol branches or polyoxiranylalkanol branches.

Methods are provided for preparing the hydraulic fracturing fluid including the crosslinker. The methods include combining the aqueous fluid and the acrylamide-based polymer to obtain a stock solution; adding to the stock solution at least one inert ingredient chosen from buffers, antioxidants, biocides, clay stabilizers, diverting agents, fluid loss additives, friction reducers, iron controllers, gel stabilizers, and surfactants; adjusting the pH of the stock solution to greater than 6; adding the crosslinker to the stock solution; and agitating the stock solution to allow a crosslinked gel to form, thereby obtaining the hydraulic fracturing fluid.

Methods of treating a subterranean formation include contacting the subterranean formation with a hydraulic fracturing fluid according to this disclosure and subsequently propagating at least one subterranean fracture in the subterranean formation with the hydraulic fracturing fluid.

These and other features, aspects, and advantages will become better understood with reference to the following description and the appended claims.

Additional features and advantages of the embodiments described herein will be set forth in the detailed description that follows, and in part will be readily apparent to those skilled in the art from that description or recognized by practicing the embodiments described herein, including the detailed description that follows, the claims, and the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
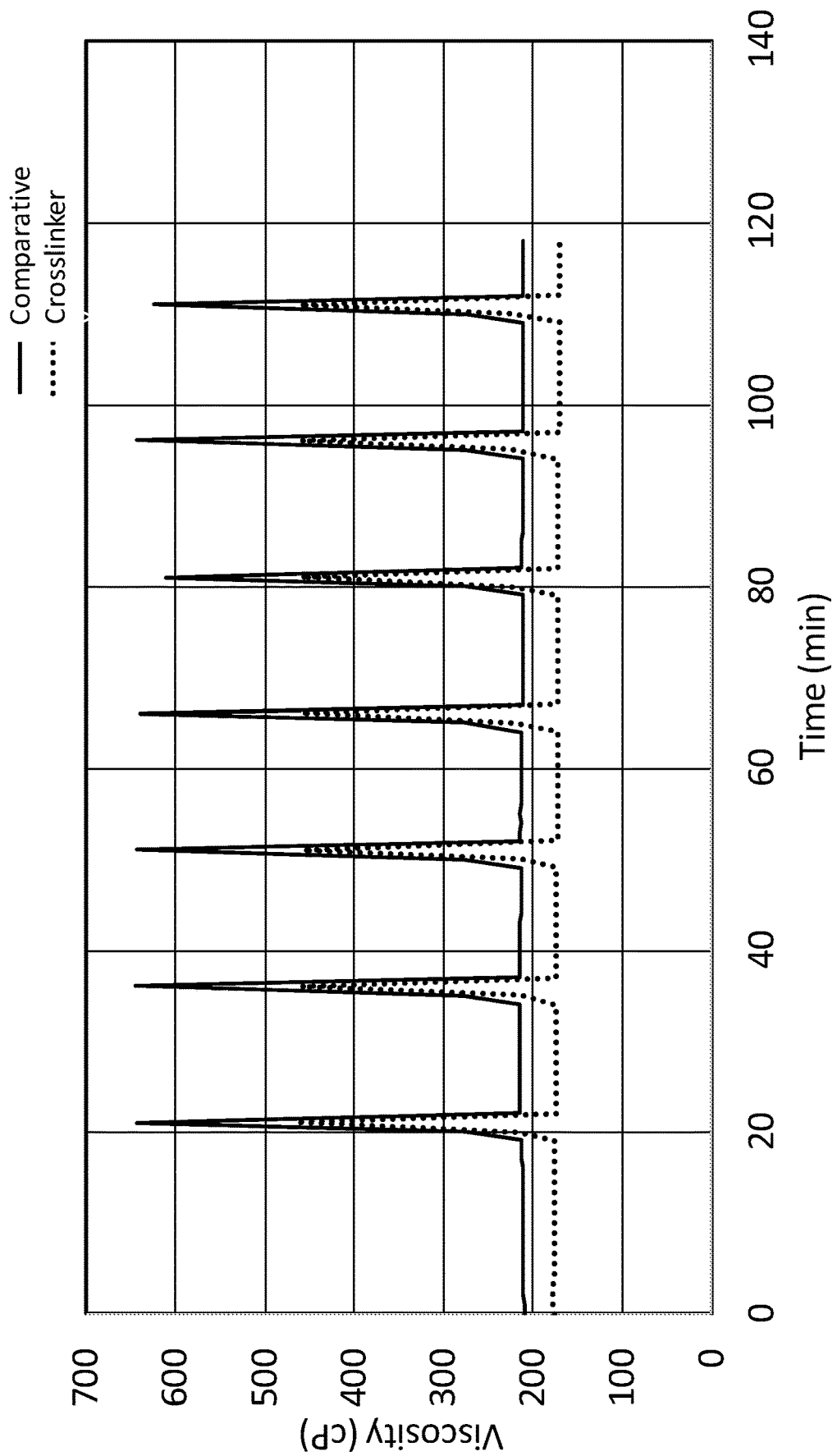
FIG. 1 is a graph of rheological data of hydraulic fracturing fluids including the crosslinker or a comparative commercial polyethyleneimine (PEI) polymer, acquired by a standard ISO13503-1 testing schedule, measured at room temperature (18° C.).

As used throughout this disclosure, the term "hydraulic fracturing" refers to a stimulation treatment routinely performed on hydrocarbon wells in reservoirs with a permeability of less than 10 milliDarcys. Hydraulic fracturing fluids are pumped into a subsurface formation, causing a fracture to form or open. The wings of the fracture extend away from the wellbore in opposing directions according to the natural stresses within the subsurface formation. Proppants are mixed with the treatment fluid to keep the fracture open when the treatment is complete. Hydraulic fracturing creates fluidic communication with a subsurface formation and bypasses damage, such as condensate banking, that may exist in the near-wellbore area.

As used throughout this disclosure, the term "subterranean formation" refers to a body of rock that is sufficiently distinctive and continuous from the surrounding rock bodies that the body of rock can be mapped as a distinct entity. A subterranean formation is, therefore, sufficiently homogenous to form a single identifiable unit containing similar rheological properties throughout the subsurface formation, including, but not limited to, porosity and permeability. A subterranean formation is the fundamental unit of lithostratigraphy.

As used throughout this disclosure, the term "lithostatic pressure" refers to the pressure of the weight of overburden, or overlying rock, on a subsurface formation.

As used throughout this disclosure, the term "producing subsurface formation" refers to the subsurface formation from which hydrocarbons are produced.

As used throughout this disclosure, the term "proppants" refers to particles mixed with hydraulic fracturing fluid to hold fractures open after a hydraulic fracturing treatment. Proppant materials are carefully sorted for mesh size, roundness and sphericity to provide an efficient conduit for fluid production from the reservoir to the wellbore.

As used throughout this disclosure, the term "drilling fluid" refers to liquid and gaseous fluids and mixtures of fluids and solids (as solid suspensions, mixtures and emulsions of liquids, gases and solids) used in operations to drill wellbores.

As used throughout this disclosure, the term "reservoir" refers to a subsurface formation having sufficient porosity and permeability to store and transmit fluids.

As used throughout this disclosure, the term "wings" refers to the two cracks formed by a fracture being 1800 apart and typically similar in shape and size.

As used throughout this disclosure, the term "wellbore" refers to the drilled hole or borehole, including the openhole or uncased portion of the well. Borehole may refer to the inside diameter of the wellbore wall, the rock face that bounds the drilled hole.

To produce hydrocarbons from a hydrocarbon-containing reservoir, production wells are drilled to a depth that enables hydrocarbons to travel from the subsurface formation to the surface. However, when producing hydrocarbon gas, the wellbore and subsurface formation pressure decrease as the volume of hydrocarbon gas in the reservoir decreases. If pressure decreases to less than the dew point of the hydrocarbon gas, condensate may form and create a liquid blockage. This liquid blockage decreases the permeability between the wellbore and the subsurface formation thereby decreasing the rate of production of the hydrocarbon gas.

Reference will now be made in detail to hydraulic fracturing fluids. Methods of preparing the hydraulic fracturing fluids and methods of treating a subterranean formation with the hydraulic fracturing fluids will be described subsequently.

A hydraulic fracturing fluid includes an aqueous fluid, a synthetic polymer, a crosslinker that crosslinks the synthetic polymer to form a crosslinked gel, and, optionally, one or more additional inert additives. In some examples, the synthetic polymer may be a carboxyl-containing polymer such as a carboxyl-containing synthetic polymer produced from one or more monomers containing carboxyl groups or derivatives thereof, such as salts or esters of the carboxyl containing monomers. Examples of carboxyl-containing polymers include acrylates and polyacrylamides (PAMs). The crosslinker interacts with at least a portion of carboxyl-containing synthetic polymer in solution with the aqueous fluid (also called a base fluid) to form the crosslinked gel having a three-dimensional polymer network, thereby increasing stability and viscosity of the hydraulic fracturing fluid. Increased viscosity in a hydraulic fracturing fluid leads to better suspension of the proppant in the fracturing fluid. In turn, proper suspension of the proppant holds the subterranean formation open to allow extraction of the gas or oil without any damage to the subterranean formation.

In some aspects, the crosslinked gel of the hydraulic fracturing fluid may include the aqueous fluid, an acrylamide-based polymer, and a crosslinker that crosslinks the acrylamide-based polymer. The crosslinker comprises a cellulose backbone functionalized with branch structures. The branch structures comprise oxiranylalkanol branches or polyoxiranylalkanol branches.

The aqueous fluid of the hydraulic fracturing fluid may be any water-based medium suitable for hydraulic fracturing operations, the specifications and requirements of which should be understood to the person having ordinary skill in the art of hydraulic fracturing. Examples of aqueous fluids include water or a solution containing both water and one or more organic or inorganic compounds dissolved in the water or otherwise completely miscible with the water. The aqueous fluid may contain water from any source, including freshwater, well water, filtered water, distilled water, sea water, salt water, produced water, formation brine, other type of water, or combinations of waters. The aqueous fluid may contain brine, including natural and synthetic brine.

The aqueous fluid may include water containing water-soluble organic compounds, such as alcohols, organic acids, amines, aldehydes, ketones, esters, or other polar organic compounds for example, or salts dissolved in the water. The aqueous phase may include salts, water-soluble organic compounds, or both, as impurities dissolved in the water. Alternatively, in embodiments, the aqueous phase may include salts, water-soluble organic compounds, or both salts and water-soluble organic compounds to modify at least one property of the aqueous phase, such as the density of the aqueous phase. In some embodiments, increasing the amount of salt, water-soluble organic compounds, or both salt and water-soluble organic compounds in the aqueous phase may increase the density of the hydraulic fracturing fluid. In some embodiments, salts that may be present in the aqueous phase may include metal salts such as sodium salts, calcium salts, cesium salts, zinc salts, aluminum salts, magnesium salts, potassium salts, strontium salts, silicates, lithium salts, or combinations of these, for example. The metal salts may be in the form of chlorides, bromides, carbonates, hydroxides, iodides, chlorates, bromates, formates, nitrates, sulfates, phosphates, oxides, fluorides or combinations of these, for example.

The acrylamide-based polymer of the hydraulic fracturing fluid may be a polyacrylamide polymer or copolymer. Examples of polyacrylamide polymers include polyacrylamide homopolymer, a polyacrylamide copolymer, a polyacrylamide terpolymer, a polyacrylamide tetrapolymer, or combinations thereof. The polyacrylamide polymer, whether a copolymer, terpolymer, or tetrapolymer may include at least one monomer selected from the group consisting of acrylic acid, or other monomers containing carboxyl groups or their salts or esters such as acrylates, and combinations thereof. Examples of such acrylates include, without limitation, methyl acrylate, ethyl acrylate, n-propyl acrylate, isopropyl acrylate, n-butyl acrylate, isobutyl acrylate, tert-butyl acrylate, and n-octyl acrylate. The acrylamide-based polymer may include other monomers in addition to the carboxyl-containing monomer. Such other monomers may include, for example, acrylamide, methacrylamide, or N-substituted acrylamides. Further examples of said N-substituted acrylamides include, among others, N-methyl acrylamide, N-propyl acrylamide, N-butyl acrylamide, N,N-dimethyl acrylamide, and N-methyl-N-sec-butyl acrylamide.

As stated previously, the crosslinker crosslinks the acrylamide-based polymer to form the crosslinked gel in the hydraulic fracturing fluid. Various amounts of the crosslinker are contemplated for the crosslinked gel. In one example, the hydraulic fracturing fluid may include from 1 pound to 100 pounds of crosslinked gel per thousand gallons of hydraulic fracturing fluid. In another example, the hydraulic fracturing fluid may include from 15 pounds to 50 pounds of crosslinked gel per thousand gallons of hydraulic fracturing fluid. In another example, the hydraulic fracturing fluid may include from 20 pounds to 45 pounds of crosslinked gel per thousand gallons of hydraulic fracturing fluid. It should be understood that the unit of pounds per thousand gallons (pptg) is customary and noted that 1.00 pptg is equivalent to approximately 0.120 grams per liter (g/L) or 120 grams per 1000 liters (g/1000 L).

The crosslinker includes a cellulose backbone functionalized with branch structures. Example crosslinkers are functionalized cellulose compounds according to formula (I):

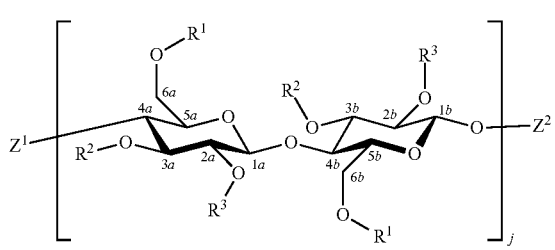
(I)

Formula (I) represents a repeat unit of a functionalized cellulose backbone that includes two monomeric D-glucose units. In formula (I), the carbon atoms in one of the two D-glucose units are labeled 1a, 2a, 3a, 4a, 5a, and 6b, and the carbon atoms of the other D-glucose unit are labeled 1b, 2b, 3b, 4b, 5b, and 6b. The two monomeric D-glucose units of the functionalized cellulose backbone are β(1→4) linked through an ether linkage between carbon atom 1a of one D-glucose unit and carbon atom 4b of the other D-glucose unit.

In formula (I), $Z^1$ and $Z^2$ are terminal groups of the functionalized cellulose backbone. In specific examples, $Z^1$ of formula (I) is independently selected from —OH or a terminal single D-glucose unit according to formula (Ia):

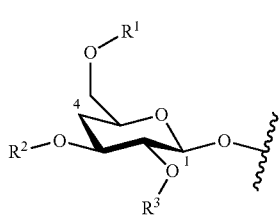
(Ia)

In specific examples, $Z^2$ of formula (I) is independently selected from —H or a terminal single D-glucose unit according to formula (Ib):

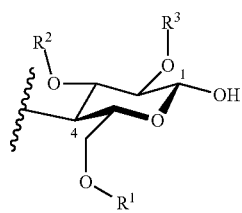
(Ib)

In formula (I), formula (Ia), and formula (Ib), $R^1$, $R^2$, and $R^3$ are independently selected from —H or branch structures that functionalize the cellulose backbone, as described subsequently in detail. At least a portion of the groups $R^1$, $R^2$, and $R^3$ collectively in the functionalized cellulose backbone of formula (I) are branch structures. In this sense, the structure according to formula (I), in which every $R^1$, $R^2$, and $R^3$ in every repeat unit would be strictly a non-functionalized cellulose structure. The cellulose structure or cellulose backbone thus is regarded to be functionalized insofar as at least a portion of the groups $R^1$, $R^2$, and $R^3$ on at least a portion of the repeat units of the structure represented by formula (I) are branch structures.

In formula (I), subscript j represents the number of cellulose residues in the cellulose backbone. In examples, subscript j is an integer from 1 to 1,000,000,000, from 1 to 1,000,000, from 5 to 1,000,000, from 10 to 1,000,000, from 50 to 1,000,000, from 100 to 1,000,000, from 1,000 to 1,000,000, from 10,000 to 1,000,000, from 100,000 to 1,000,000, from 2 to 500,000, from 2 to 500,000, from 5 to 500,000, from 10 to 500,000, from 50 to 500,000, from 100 to 500,000, from 1,000 to 500,000, from 10,000 to 500,000, from 100,000 to 500,000, or subsets of any of the foregoing ranges.

In the crosslinker including a functionalized cellulose backbone according to formula (I), hydrogen atoms in the hydroxyl groups on the D-glucose monomers may form hydrogen bonds with oxygen atoms on the same ring structure or on a nearby ring structure. Collectively, these hydrogen bonds hold the celluloses firmly together side-by-side, thereby forming three-dimensional structures and imparting tensile strength to the three-dimensional structures.

As previously mentioned, the cellulose backbone of formula (I) is functionalized in that at least some portion of the groups $R^1$, $R^2$, and $R^3$ are branch structures. Specifically, in formula (I), as noted above, $R^1$, $R^2$, and $R^3$ are independently selected from —H or branch structures. In a single cellulose residue or repeat unit as depicted between the square brackets in formula (I), $R^1$, $R^2$, and $R^3$ may be the same or different. Furthermore, the individual cellulose residues in the crosslinker may be identical but need not be identical. Individual cellulose residues may have the same or different $R^1$, $R^2$, and $R^3$ compared to other individual cellulose residues. As a non-limiting example, a crosslinker may include a functionalized cellulose backbone according to formula (I) any combination of individual cellulose residues in which: (a) all of $R^1$, $R^2$, and $R^3$ are branch structures; (b) $R^1$ is —H, and both $R^2$ and $R^3$ are branch structures; (c) $R^2$ is —H, and both $R^1$ and $R^3$ are branch structures; (d) $R^3$ is —H, and both $R^1$ and $R^2$ are branch structures; (e) $R^1$ and $R^2$ are —H, and $R^2$ is a branch structure; (f) $R^1$ and $R^3$ are —H, and $R^2$ is a branch structure; (g) $R^2$ and $R^3$ are —H, and $R^1$ is a branch structure; or (h) all of $R^1$, $R^2$, and $R^3$ are —H, provided not every cellulose residue is of type (h) in which all of $R^1$, $R^2$, and $R^3$ are —H.

In the crosslinker, particularly in the functionalized cellulose backbone as a whole, as represented in an exemplary manner by formula (I), from 30% to 70% of all groups $R^1$, $R^2$, and $R^3$ are branch structures, the remainder being —H. For example, across the entire cellulose backbone, from 30% to 70%, from 40% to 70%, from 50% to 70%, from 60% to 70%, from 30% to 60%, from 40% to 60%, from 50% to 60%, from 30% to 50%, from 40% to 50%, or from 30% to 40% of all groups $R^1$, $R^2$, and $R^3$ are branch structures.

Branch structures of the functionalized cellulose backbone according to formula (I) may be monomeric or polymeric. The branch structures may include a terminal end farthest away from the cellulose backbone that the branch structure functionalizes or may crosslink a first cellulose chain and a second cellulose chain. Non-limiting examples of branch structures include oxiranylalkanol branches and hydroxypropyl branches, either of which may have a terminal end or may crosslink a first cellulose chain and a second cellulose chain. In specific examples, the crosslinker includes a functionalized cellulose backbone according to formula (I), in which the groups $R^1$, $R^2$, and $R^3$ are independently, —H or branch structures chosen from oxiranylalkanol branches or hydroxypropyl branches. In more specific examples, the crosslinker includes a functionalized cellulose backbone according to formula (I), in which the groups $R^1$, $R^2$, and $R^3$ are independently, —H or branch structures chosen from polyglycidol branches or hydroxypropyl branches.

Oxiranylalkanol branches are branch structures that include at least one oxiranylalkanol residue. Oxiranylalkanol branches include polyoxiranylalkanol branches that include multiple polymerized oxiranylalkanol residues. Oxiranylalkanols are oxirane derivatives, in which one hydrogen atom of oxirane is replaced with an alkanol. Generally, polyoxiranylalkanol result from the polymerization of an oxiranylalkanol compound of formula (IV):

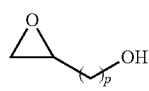
(IV)

In formula (IV), subscript p, represents a length of an alkylene chain of —(CH$_2$)— units. In examples, subscript p is an integer from 1 to 10, from 1 to 7, from 1 to 5, from 1 to 4, from 1 to 3, from 1 to 2, or equal to 1. When subscript p equals 1, the oxiranylalkanol is oxiranylmethanol (glycidol). When subscript p equals 2, the oxiranylalkanol is oxiranylethanol. When subscript p equals 3, the oxiranylalkanol is oxiranylpropanol. When subscript p equals 4, the oxiranylalkanol is, oxiranylbutanol. When subscript p equals 5, the oxiranylalkanol is oxiranylpentanol.

In some examples, the branch structures are linear or branched polymers of oxiranylalkanols. In linear polymers of oxiranylalkanols, the oxiranylalkanol residues form a single linear chain. In branched polymers of oxiranylalkanols, the oxiranylalkanol residues form a main chain with one or more substituent side chains. The main chain with one or more substituent side chains may have a regular, repeating structure with a polydispersity of molecular weight from 0.95 to 1.05, or the main chain with one or more substituent side chains may have more irregular structures with a polydispersity of molecular weight of greater than or equal to 1.1.

In some examples, the branch structures are methylene-linked polyglycidol branches according to Formula (IIIa):

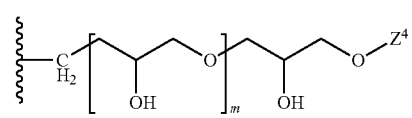
(IIIa)

In Formula (IIIa), subscript m represents the number of glycidol residues in the polyglycidol branch. In examples, subscript m is an integer from 1 to 1000, from 1 to 500, from 1 to 250, from 1 to 100, from 1 to 10, from 1 to 5, or equal to 1. In formula (IIIa), $Z^4$ is a terminal —H, a crosslinking connection to the acrylamide-based polymer of the hydraulic fracking fluid, or a crosslinking connection to another cellulose backbone, such as to another functionalized cellulose backbone according to formula (I).

In some examples, the branch structures are ester-linked polyglycidol branches of Formula (IIIb):

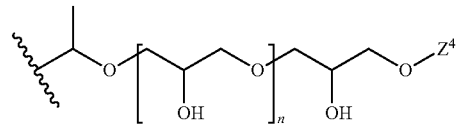
(IIIb)

In Formula (IIIb), subscript n represents the number of glycidol residues in the polyglycidol branch. In examples, subscript n is an integer from 1 to 1000, from 1 to 500, from 1 to 250, from 1 to 100, from 1 to 10, from 1 to 5, or equal to 1. In formula (IIIb), $Z^4$ is a terminal —H, a crosslinking connection to the acrylamide-based polymer of the hydraulic fracking fluid, or a crosslinking connection to another cellulose backbone, such as to another functionalized cellulose backbone according to formula (I).

As should be understood by the skilled person, glycidol may be polymerized by multiple methods distinguished by how the next glycidol molecule attacks the reactive point of the propagating polyglycidol polymer chain. Depending on the polymerization method used by the first glycidol moleculeto react with a hydroxyl group or other functional group on the cellulose backbone, either the methyl-linked polyglycidol branch structure of Formula (IIIa) or the ester-linked polyglycidol branch structure of Formula (IIIb) may result.

Hydroxypropyl branch structures are branch structures that include one or more hydroxypropyl residues. Hydroxypropyl residues include compounds that result from a ring opening reaction of propylene oxide. Propylene oxide and hydroxypropyl residues can polymerize to form hydroxypropyl branch structures. Generally, hydroxypropyl branch structures result from the polymerization of a propylene oxide.

Hydroxypropyl Branches have Formula (II):

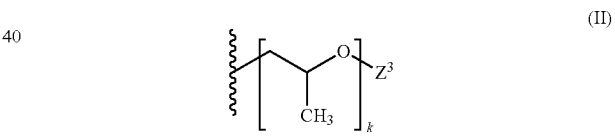
(II)

In Formula (II), subscript k represents the number of hydropropyl residues in the hydroxypropyl branch. In examples, subscript k is an integer from 1 to 10, from 1 to 7, from 1 to 5, from 1 to 4, from 1 to 3, from 1 to 2, or equal to 1. In formula (II), $Z^3$ is —H, a crosslinking connection to the acrylamide-based polymer of the hydraulic fracking fluid, or a crosslinking connection to another cellulose backbone, such as to another functionalized cellulose backbone according to formula (I).

As previously described, the crosslinker of the hydraulic fracking fluid may be the product of reacting a cellulose compound with an oxiranylalkanol compound. Examples of cellulose compounds include cellulose and modified celluloses. As a non-limiting example, cellulose may be reacted with propylene oxide so that the propylene oxide chemically modifies the cellulose to produce hydroxypropyl cellulose including hydroxypropyl branches then, subsequently, the hydroxylpropyl cellulose is reacted with an oxiranylalkanol to functionalize the hydroxypropyl cellulose with oxiranylalkanol branches. In a specific, non-limiting example, cellulose is reacted with propylene oxide to produce hydroxypropyl cellulose including hydroxypropyl branches, then the hydroxylpropyl cellulose is reacted with glycidol to functionalize the hydroxypropyl cellulose with polyglycidol branches. In further non-limiting examples, the cellulose compounds that may be reacted with oxiranylalkanol compounds such as glycidol may be chosen from cellulose, hydroxypropyl cellulose, methylcellulose, carboxymethyl cellulose, hydroxyethyl cellulose, cyanoethylcellulose, ethylcellulose, methylcellulose, hydroxypropylmethylcellulose, carboxymethylhydroxyethylcellulose, or combinations thereof.

In addition to the aqueous fluid, the acrylamide-based polymer, and the hyperbranched crosslinker, the hydraulic fracturing fluid may further include one or more additional ingredients or additives. Examples of such additives include, without limitation, clay-based components or proppants. The optional clay-based component may include one or more components selected from lime (CaO), $CaCO_3$, bentonite, montmorillonite clay, barium sulfate (barite), hematite ($Fe_2O_3$), mullite ($3Al_2O_3 \cdot 2SiO_2$ or $2Al_2O_3 \cdot SiO_2$), kaolin, ($Al_2Si_2O_5(OH)_4$ or kaolinite), alumina ($Al_2O_3$, or aluminum oxide), silicon carbide, tungsten carbide, or combinations thereof. Proppants within the hydraulic fracturing fluid may aid in treating subsurface fractures, to prop open and keep open the fracture. The hydraulic fracturing fluid in the subsurface fracture may comprise proppants suspended in the hydraulic fracturing fluid. In some embodiments, the proppants may be distributed throughout the hydraulic fracturing fluid. Proper suspension of the proppant holds a subterranean formation open to allow extraction of the gas or oil without any damage to the subterranean formation.

The hydraulic fracturing fluid optionally may include additives that alter the salt concentration of the crosslinked gel. For example, the hydraulic fracking fluid may include a brine solution, such as KCl brine or $CaCl_2$ brine. Optionally, the hydraulic fracturing fluid may include additional components such as buffers, antioxidants, biocides, clay stabilizers, diverting agents, fluid loss additives, friction reducers, iron controllers, or gel stabilizers. The fracturing fluid may further include a surfactant that decreases the surface tension of the fracturing fluid. Example surfactants include anionic surfactants, cationic surfactants, amphoteric surfactants, zwitterionic surfactants, or combinations thereof.

Optionally, the hydraulic fracturing fluid may include a breaker to degrade the crosslinked gel. The breaker may be included to "break" or reduce the viscosity of the fracturing fluid so that the fracturing fluid may be easily recovered from the fracture during clean up. Example breakers include acids, oxidizers, enzyme breakers, chelating agents, or combinations thereof. Specific examples of breakers include, but are not be limited to sodium bromate, potassium bromate, sodium persulfate, ammonium persulfate, potassium persulfate, and various peroxides. Additionally, the hydraulic fracking fluid may include an encapsulant to control or delay the release of the breaker encapsulated or disposed therein. In some examples, the breaker may include a combination of encapsulated and unencapsulated breaker. For example, the breaker may include a combination of sodium bromate and encapsulated sodium bromate.

Having described the hydraulic fracturing fluid in detail, methods of preparing the hydraulic fracturing fluid will now be described. Methods of preparing the hydraulic fracturing fluid include combining the aqueous fluid and the acrylamide-based polymer to obtain a stock solution. To the stock solution, at least one inert ingredient is added, chosen from buffers, antioxidants, biocides, clay stabilizers, diverting agents, fluid loss additives, friction reducers, iron controllers, gel stabilizers, or surfactants, for example. Before, during, or after the addition of the inert ingredient, the pH of the stock solution is adjusted to greater than 6. The crosslinker is added to the stock solution, and the stock solution is then agitated or stirred to allow a crosslinked gel to form and thereby obtain the hydraulic fracturing fluid.

The hydraulic fracturing fluids of this disclosure may be applied in methods of treating a subterranean formation. Methods of treating a subterranean formation include contacting the subterranean formation with a hydraulic fracturing fluid that includes an aqueous fluid, an acrylamide-based polymer, and a crosslinker including a cellulose backbone functionalized with branch structures as previously described. Then, at least one subterranean fracture is propagated in the subterranean formation with the hydraulic fracturing fluid. The contacting of the subterranean formation may include injecting the hydraulic fracturing fluid into the subterranean formation. The contacting of the subterranean formation may further include drilling into the subterranean formation and injecting the hydraulic fracturing fluid into the at least one subterranean fracture in the subterranean formation. The subterranean formation may include rock, shale, or coal, as non-limiting examples.

The present disclosure includes one or more non-limiting aspects. A first aspect includes a hydraulic fracturing fluid. The hydraulic fracturing fluid includes an aqueous fluid, an acrylamide-based polymer, and a crosslinker that crosslinks the acrylamide-based polymer to form a crosslinked gel, wherein the crosslinker comprises a cellulose backbone functionalized with branch structures, and the branch structures comprise oxiranylalkanol branches or polyoxiranylalkanol branches.

A second aspect includes the first aspect, wherein the acrylamide-based polymer comprises a polyacrylamide homopolymer, a polyacrylamide copolymer, a polyacrylamide terpolymer, a polyacrylamide tetrapolymer, or combinations thereof.

A third aspect includes the first or second aspects, wherein the branch structures comprise polyoxiranylalkanol branches comprising from 1 to 10 linear or branched oxiranylalkanol residues.

A fourth aspect includes any of the first through third aspects, wherein the polyoxiranylalkanol branches of the crosslinker as a whole have an average of 2 oxiranylalkanol residues per polyoxiranylalkanol branch.

A fifth aspect includes any of the first through fourth aspects, wherein the branch structures are linear polymers of oxiranylalkanols.

A sixth aspect includes any of the first through fifth aspects, wherein the branch structures comprise one or more hydroxypropyl residues.

A seventh aspect includes any of the first through sixth aspects, wherein the cellulose backbone has formula (I) as presented herein, wherein j represents a number of repeating cellulose residues in the cellulose backbone and is from 1 to 100,000, each $Z^1$ is a —OH or a single D glucose unit according to formula (Ia) as presented herein, each $Z^2$ is —H or a single D glucose unit according to formula (Ib) as presented herein, each $R^1$, each $R^2$, and each $R^3$ in formula (I), formula (Ia), and formula (Ib) are independently chosen from —H or a branch structure chosen from hydropropyl branch structures of formula (II) as presented herein, where k is from 1 to 10, and $Z^3$ is —H, a crosslinking connection to the acrylamide-based polymer, or a crosslinking connection to another cellulose backbone, a methylene-linked polyglycidol branch structures of formula (IIIa) as presented herein, where m is from 0 to 1000, and $Z^4$ is —H, a crosslinking connection to the acrylamide-based polymer, or a crosslinking connection to another cellulose backbone, or an ester-linked polyglycidol branch structures of formula (IIIb) as presented herein, where n is from 0 to 1000, and $Z^4$ is —H, a crosslinking connection to the acrylamide-based polymer, or a crosslinking connection to another cellulose backbone, provided at least one of $R^1$, $R^2$, or $R^3$ in the cellulose backbone has formula (IIIa) or formula (IIIb).

An eighth aspect includes the first through seventh aspects, wherein from 30% to 70% of groups $R^1$, $R^2$, and $R^3$ are branch structures having formula (IIIa) or (IIIb).

A ninth aspect includes the first through eighth aspects, wherein the crosslinker is a product of reacting a cellulose compound with a compound according to formula (IV) as presented herein, where p is an integer from 1 to 10, to obtain the crosslinker.

A tenth aspect includes any of the first through ninth aspects, wherein the cellulose compound is chosen from cellulose, hydroxypropyl cellulose, methylcellulose, carboxymethyl cellulose, hydroxyethyl cellulose, cyanoethylcellulose, ethylcellulose, methylcellulose, hydroxypropylmethylcellulose, carboxymethylhydroxyethylcellulose, and combinations thereof.

An eleventh aspect includes any of the first through tenth aspects, wherein the compound of formula (IV) is glycidol.

A twelfth aspect includes a method of preparing the hydraulic fracturing fluid according to any of the first through eleventh aspects. The method of the twelfth aspect includes combining the aqueous fluid and the acrylamide-based polymer to obtain a stock solution, adding to the stock solution at least one inert ingredient chosen from buffers, antioxidants, biocides, clay stabilizers, diverting agents, fluid loss additives, friction reducers, iron controllers, gel stabilizers, and surfactants, adjusting the pH of the stock solution to greater than 6, adding the crosslinker to the stock solution, and agitating the stock solution to allow a crosslinked gel to form, thereby obtaining the hydraulic fracturing fluid.

A thirteenth aspect includes method of treating a subterranean formation. The method includes contacting the subterranean formation with a hydraulic fracturing fluid according to any of the first through eleventh aspects and propagating at least one subterranean fracture in the subterranean formation with the hydraulic fracturing fluid.

A fourteenth aspect includes the thirteenth aspect, wherein contacting the subterranean formation includes injecting the hydraulic fracturing fluid into the subterranean formation.

A fifteenth aspect includes the thirteenth and fourteenth aspect, wherein contacting the subterranean formation further includes drilling into the subterranean formation, and injecting the hydraulic fracturing fluid into the at least one subterranean fracture in the subterranean formation.

A sixteenth aspect includes any of the thirteenth through fifteenth aspects, wherein the subterranean formation comprises rock, shale, or coal.

EXAMPLES

The following Examples are offered by way of illustration and are presented in a manner such that one skilled in the art should recognize are not meant to be limiting to the present disclosure as a whole or to the appended claims.

To investigate polyacrylamide gelation characteristics of crosslinkers according to the present disclosure, a sample was prepared according to the following procedure.

First, 1 gram of hydroxypropyl cellulose having a molecular weight of approximately 26 KDa was placed into a 250-mL round bottomed flask. Then, 100 mL of dimethylformamide (DMF) was added with 10 mL of distilled water, and the mixture was stirred at 90° C. for 1 hour until all the hydroxypropyl cellulose had dissolved. Next, 1 mL of 1,8-diazabicyclo[5.4.0]undec-7-ene (DBU) was added to this mixture, followed by 17 mL (0.25 mol) of glycidol, and the reaction mixture was left to stir at 90° C. for 24 hours.

The crude mixture was emptied into a beaker and, after cooling the mixture to room temperature, aqueous hydrochloric acid (HCl) was added slowly to bring the pH of the reaction mixture to approximately 7. The crude mixture then was purified by carrying out dialysis in water, using dialyses tubing with a molecular weight cut-off of 14 kDa to isolate a highly viscous product.

Rheological testing was performed to compare the crosslinker prepared as described above and commercial hyperbranched PEI polymer at both room temperature (18° C.) and 200° F. (93° C.). Rheology testing was performed with a Chandler 5550 HPHT Rotational Viscometer. A standard ISO13503-1 testing schedule was followed by measuring viscosity at 100 $s^{-1}$, 75 $s^{-1}$, 50 $s^{-1}$, and 25 $s^{-1}$ every 15 minutes after initial heat-up at 100 $s^{-1}$ for 20 minutes. The ISO13503-1 protocol is hereby incorporated herein by reference in its entirety.

Figure 2:
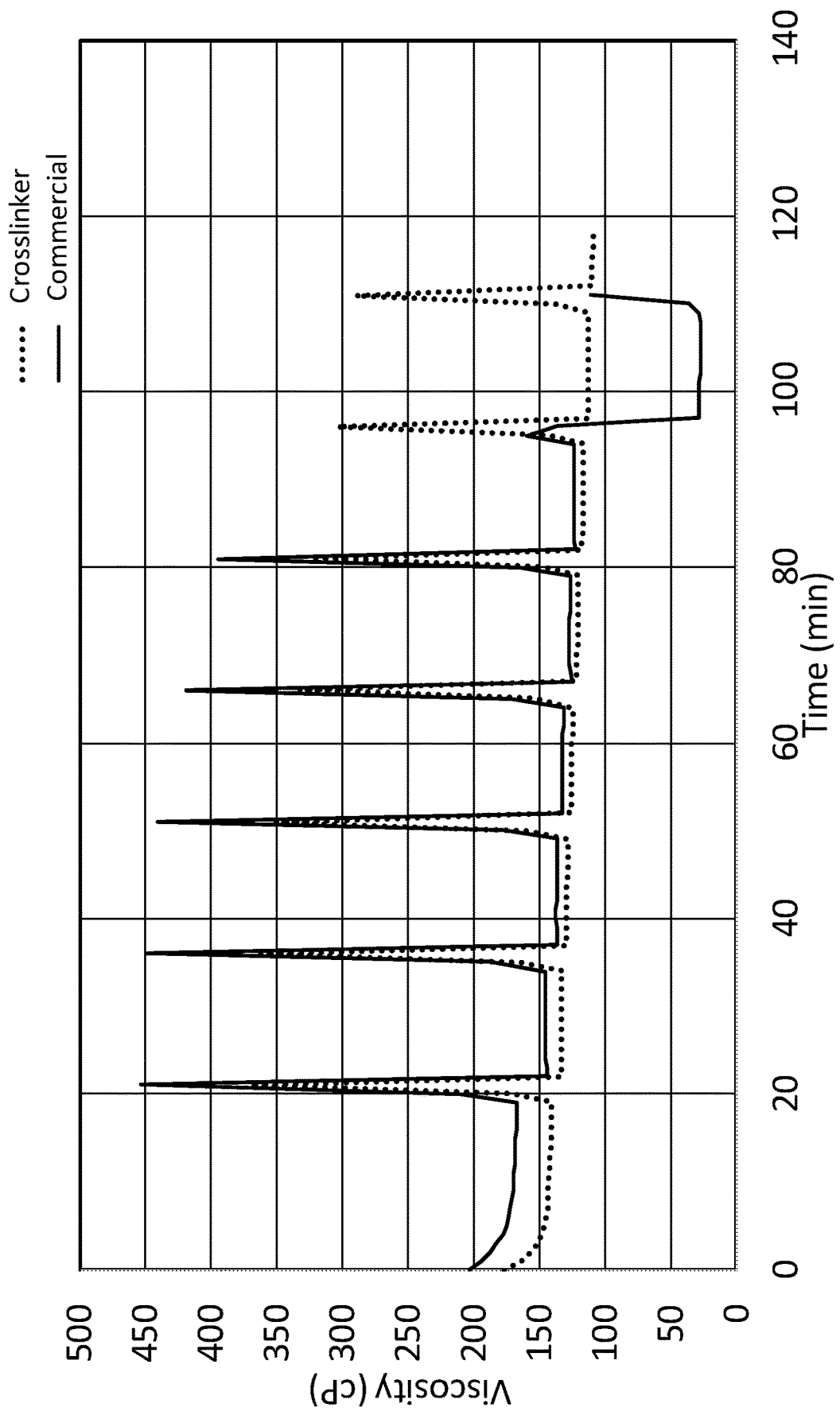
FIG. 2 is a graph of rheological data of hydraulic fracturing fluids including the crosslinker or a comparative commercial polyethyleneimine (PEI) polymer, acquired by a standard ISO13503-1 testing schedule, measured at 200° C. (93° C.).

The testing was done with a full recipe of hydraulic fracturing fluid as listed in Table 1. The room-temperature data is provided in FIG. 1, and the data at 200° F. (93° C.) is provided in FIG. 2.

TABLE 1

Fracturing fluid recipe for comparative testing

| Component | Ingredient | Volume Percent |
|---|---|---|
| Polymer | Polyacrylamide | 0.016 |
| Surfactant | Flow-back enhancer | 0.002 |
| Clay Control | Tetramethylammonium chloride (TMAC) | 0.002 |
| Gel Stabilizer | TYZOR 212 (organic zirconate) | 0.002 |
| Aqueous Fluid | Water | Balance |

At room temperature (65° F.; 18° C.), both samples exhibited similar crosslinking properties and stability. The commercial hyperbranched PEI polymer showed stability at 200 cP at 100 $s^{-1}$, while the crosslinker prepared as described above had a slightly lower viscosity of 180 cP. On the other hand, when the temperature was increased to 200° F. (93° C.), the difference in the viscosity of the tested samples was quite apparent. All of the samples exhibited a decrease in viscosity with time, but the commercial hyperbranched PEI held a viscosity above 100 cP for 100 minutes and then clasped. The crosslinker prepared as described above was very stable with a viscosity around 120 cp after 20 min and remained stable until end of the testing. Thus, the crosslinker prepared as described above was demonstrated as well-suited for high-temperature applications, being shown in important aspects to be superior to commercial PEI.

Characteristic proton-NMR spectra of the crosslinker prepared as described above, taken in $D_2O$ solvent, included peaks at 1.0 ppm to 1.3 ppm, attributed to functionalities of the methyl group in hydroxypropyl cellulose such as —CH—O—CH($O$—$CH_2$—CH(OH)—$CH_2$—OH)—$CH_3$ and peaks at 3.2 ppm to 5.5 ppm attributed to the functionalities of the cellulose backbone and glycidol such as —$CH_2$—, and —CH—.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. The term "substantially" is used herein also to represent the degree by which a quantitative representation may vary from a stated reference without resulting in a change in the basic function of the subject matter at issue. Thus, it is used to represent the inherent degree of uncertainty that may be attributed to any quantitative comparison, value, measurement, or other representation, referring to an arrangement of elements or features that, while in theory would be expected to exhibit exact correspondence or behavior, may in practice embody something less than exact.

Unless otherwise defined, all technical and scientific terms used herein have the same meaning as commonly understood by one of ordinary skill in the art to which the invention belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that where a first component is described as "comprising" or "including" a second component, it is contemplated that, in some embodiments, the first component "consists" or "consists essentially of" the second component. Additionally, the term "consisting essentially of" is used in this disclosure to refer to quantitative values that do not materially affect the basic and novel characteristic(s) of the disclosure.

It should be understood that any two quantitative values assigned to a property or measurement may constitute a range of that property or measurement, and all combinations of ranges formed from all stated quantitative values of a given property or measurement are contemplated in this disclosure.

Though particular embodiments have been illustrated and described herein, it will be understood by those skilled in the art that various other changes and modifications may be made without departing from scope of the claimed subject matter. Certain features that are described in this specification in the context of separate embodiments can also be implemented, in combination, in a single embodiment. Conversely, various features that are described in the context of a single embodiment can also be implemented in multiple embodiments, separately, or in any sub-combination. Moreover, although previously described features may be described as acting or being in certain combinations and even initially claimed as such through one or more multiple dependent claim, one or more features from a claimed combination can, in some cases, be excised from the combination, and the claimed combination may be directed to a sub-combination or variation of a sub-combination. It is therefore intended that the appended claims cover all such changes and modifications that are within the scope of the claimed subject matter.

What is claimed is:

1. A hydraulic fracturing fluid comprising:
   an aqueous fluid;
   an acrylamide-based polymer; and
   a crosslinker that crosslinks the acrylamide-based polymer to form a crosslinked gel, wherein:
   the crosslinker comprises a cellulose backbone functionalized with branch structures; and
   the branch structures comprise oxiranylalkanol branches or polyoxiranylalkanol branches.

2. The hydraulic fracturing fluid of claim 1, wherein the acrylamide-based polymer comprises a polyacrylamide homopolymer, a polyacrylamide copolymer, a polyacrylamide terpolymer, a polyacrylamide tetrapolymer, or combinations thereof.

3. The hydraulic fracturing fluid of claim 1, wherein:
   the branch structures comprise polyoxiranylalkanol branches comprising from 1 to 10 linear or branched oxiranylalkanol residues.

4. The hydraulic fracturing fluid of claim 3, wherein the polyoxiranylalkanol branches of the crosslinker as a whole have an average of 2 oxiranylalkanol residues per polyoxiranylalkanol branch.

5. The hydraulic fracturing fluid of claim 3, wherein the branch structures are linear polymers of oxiranylalkanols.

6. The hydraulic fracturing fluid of claim 1, wherein the branch structures comprise one or more hydroxypropyl residues.

7. The hydraulic fracturing fluid of claim 1, wherein the cellulose backbone has formula (I):

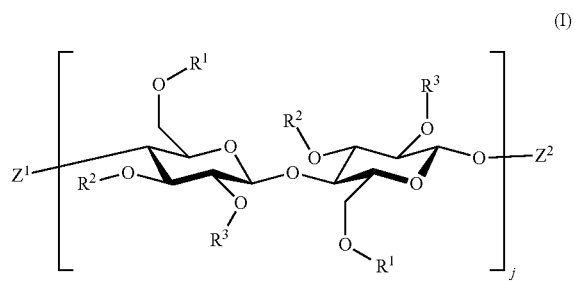

wherein:
  j represents a number of cellulose residues in the cellulose backbone and is from 1 to 100,000;
  each $Z^1$ is a —OH or a single D-glucose unit according to formula (Ia):

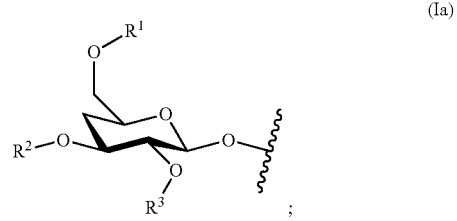

each $Z^2$ is —H or a single D-glucose unit according to formula (Ib):

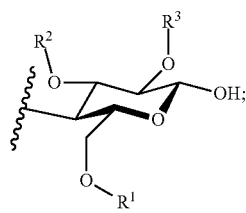

(Ib)

each $R^1$, each $R^2$, and each $R^3$ in formula (I), formula (Ia), and formula (Ib) are independently chosen from —H or a branch structure chosen from hydropropyl branch structures of formula (II):

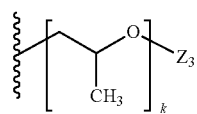

(II)

where k is from 1 to 10, and $Z^3$ is —H, a crosslinking connection to the acrylamide-based polymer, or a crosslinking connection to another cellulose backbone;

a methylene-linked polyglycidol branch structures of formula (IIIa):

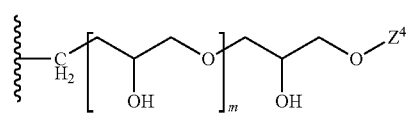

(IIIa)

where m is from 0 to 1000, and $Z^4$ is —H, a crosslinking connection to the acrylamide-based polymer, or a crosslinking connection to another cellulose backbone; or an ester-linked polyglycidol branch structures of formula (IIIb):

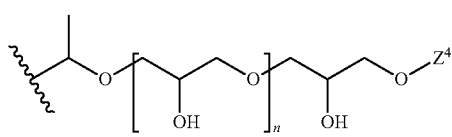

(IIIb)

where n is from 0 to 1000, and $Z^4$ is —H, a crosslinking connection to the acrylamide-based polymer, or a crosslinking connection to another cellulose backbone;

provided at least one of $R^1$, $R^2$, or $R^3$ in the cellulose backbone has formula (IIIa) or formula (IIIb).

8. The hydraulic fracturing fluid of claim 7, wherein from 30% to 70% of groups $R^1$, $R^2$, and $R^3$ are branch structures having formula (IIIa) or (IIIb).

9. The hydraulic fracturing fluid of claim 1, wherein the crosslinker is a product of reacting a cellulose compound with a compound according to formula (IV):

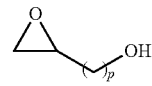

(IV)

where p is an integer from 1 to 10;
to obtain the crosslinker.

10. The hydraulic fracturing fluid of claim 9, wherein the cellulose compound is chosen from cellulose, hydroxypropyl cellulose, methylcellulose, carboxymethyl cellulose, hydroxyethyl cellulose, cyanoethylcellulose, ethylcellulose, methylcellulose, hydroxypropylmethylcellulose, carboxymethylhydroxyethylcellulose, and combinations thereof.

11. The hydraulic fracturing fluid of claim 9, wherein the compound of formula (IV) is glycidol.

12. A method of preparing the hydraulic fracturing fluid according to claim 1, the method comprising:
combining the aqueous fluid and the acrylamide-based polymer to obtain a stock solution;
adding to the stock solution at least one inert ingredient chosen from buffers, antioxidants, biocides, clay stabilizers, diverting agents, fluid loss additives, friction reducers, iron controllers, gel stabilizers, and surfactants;
adjusting the pH of the stock solution to greater than 6;
adding the crosslinker to the stock solution; and
agitating the stock solution to allow a crosslinked gel to form, thereby obtaining the hydraulic fracturing fluid.

13. A method of treating a subterranean formation, the method comprising:
contacting the subterranean formation with a hydraulic fracturing fluid according to claim 1; and
propagating at least one subterranean fracture in the subterranean formation with the hydraulic fracturing fluid.

14. The method of claim 13, wherein contacting the subterranean formation comprises injecting the hydraulic fracturing fluid into the subterranean formation.

15. The method of claim 13, wherein contacting the subterranean formation further comprises:
drilling into the subterranean formation; and
injecting the hydraulic fracturing fluid into the at least one subterranean fracture in the subterranean formation.

16. The method of claim 13, wherein the subterranean formation comprises rock, shale, or coal.

* * * * *

UNITED STATES PATENT AND TRADEMARK OFFICE
CERTIFICATE OF CORRECTION

PATENT NO. : 12,065,614 B1
APPLICATION NO. : 18/295059
DATED : August 20, 2024
INVENTOR(S) : Li et al.

It is certified that error appears in the above-identified patent and that said Letters Patent is hereby corrected as shown below:

In the Claims

Claim 7, Column 15, Line(s) 20, formula (II), delete "$Z_3$" and replace with --$Z^3$--.

Signed and Sealed this
Twenty-sixth Day of November, 2024

Katherine Kelly Vidal
*Director of the United States Patent and Trademark Office*